United States Patent [19]

Abdelmalek

[11] Patent Number: 5,133,190
[45] Date of Patent: Jul. 28, 1992

[54] METHOD AND APPARATUS FOR FLUE GAS CLEANING BY SEPARATION AND LIQUEFACTION OF SULFUR DIOXIDE AND CARBON DIOXIDE

[76] Inventor: Fawzy T. Abdelmalek, 12807 Willowyck Dr., St. Louis, Mo. 63146

[21] Appl. No.: 754,035

[22] Filed: Sep. 3, 1991

Related U.S. Application Data

[63] Continuation-in-part of Ser. No. 645,804, Jan. 25, 1991.

[51] Int. Cl.$^5$ .............................................. F01K 25/14
[52] U.S. Cl. ...................................... 60/648; 60/670; 60/671; 55/17; 62/11; 62/36
[58] Field of Search ................ 60/643, 645, 648, 670, 60/671, 721; 55/2, 17, 73; 62/11, 23, 26, 36, 40

[56] References Cited

U.S. PATENT DOCUMENTS

4,126,000 11/1978 Funk ...................... 60/648
4,885,139 12/1989 Sparks et al. .............. 55/2

Primary Examiner—Allen M. Ostrager
Attorney, Agent, or Firm—Peoples, Hale & Coleman

[57] ABSTRACT

Sulfur dioxide and carbon dioxide, emitted in flue gases are separated by gas centrifuge separators, and liquefied by gas mechanical compression and cooling means.

10 Claims, 1 Drawing Sheet

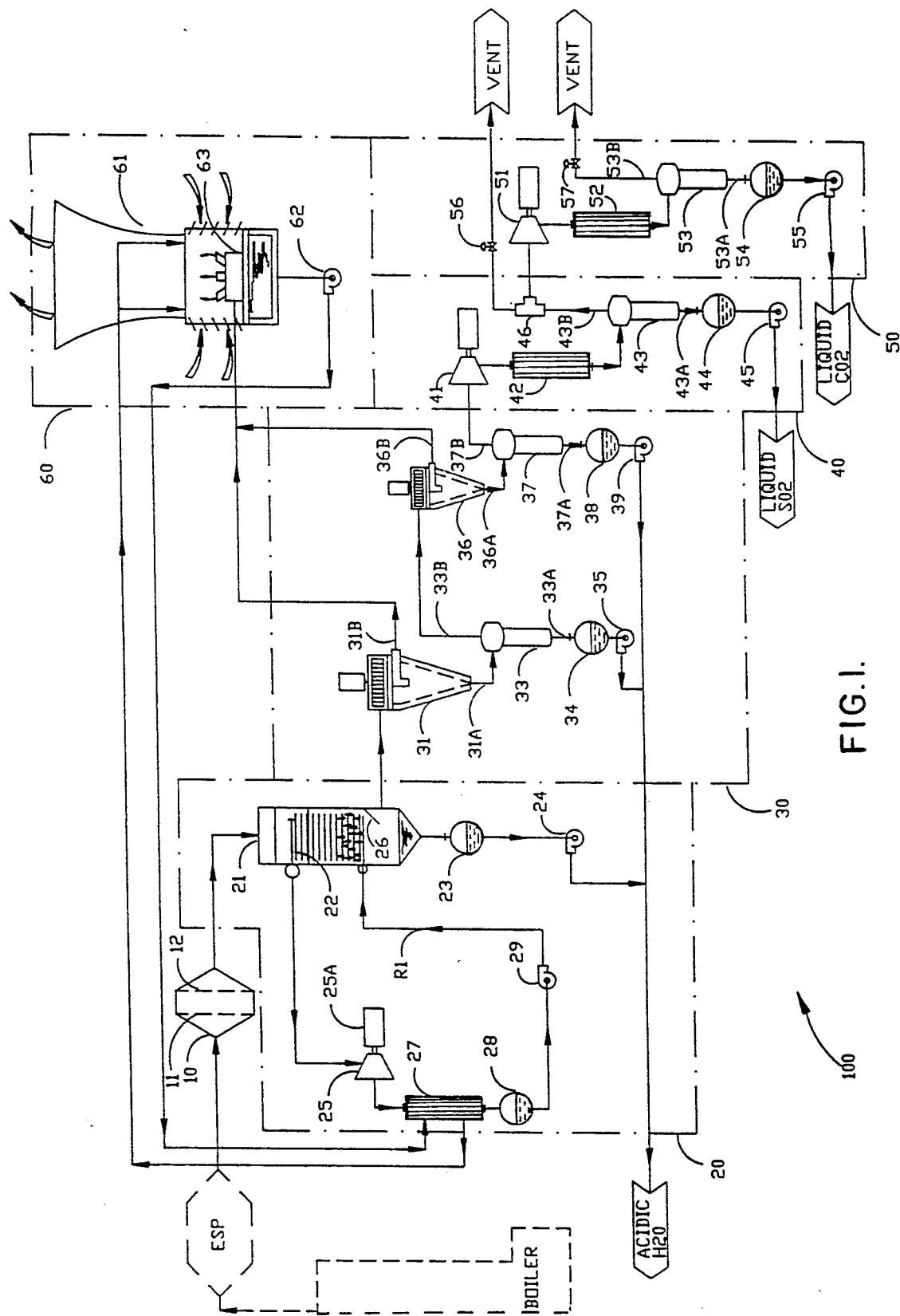
FIG. I.

5,133,190

METHOD AND APPARATUS FOR FLUE GAS CLEANING BY SEPARATION AND LIQUEFACTION OF SULFUR DIOXIDE AND CARBON DIOXIDE

BACKGROUND OF THE INVENTION

1. Field of the Invention

The present invention relates generally to cleaning of the flue gases emitted from industrial and electric utility of coal fired boilers. More particularly, it relates to a method for removing acidic vapors, sulfur dioxide and carbon dioxide by mechanical and condensation method.

2. Description of the Prior Art

In the U.S. approximately 50 million tons of sulfur dioxide emits every year into the atmosphere from coal fired electric utility power plants, and from other large coal consuming facilities. In the past attempts to recover the sulfur dioxide from the flue gases were motivated by the increasing environmental regulations, some foresaw a glut of sulfur produced from recovery, but scrubbing of flue gases with lime or lime stone, which produces calcium sulfite-sulfate waste has dominated the flue gas desulfurization (FGD) systems market. These systems were used and continued to be recommended because they have proven to be effective, and because the equipment and scrubbing materials are well known and available. Other ways to meet air pollution requirements are by switching to low sulfur containing fuels, conversion of high sulfur coal to gas or oil with removal of sulfur during the processing, and removal of sulfur dioxide in the boiler by fluidized bed combustion methods.

At the present, the wet scrubbing lime systems have dominated the FGD field, the addition of magnesium oxide or sodium based solution have been also used in flue gas scrubbing systems, there are many other chemical processes that have been used or developed to remove sulfur dioxide from the flue gases, identified as the throw away processes which creates disposal problems in connection with liquid or solid wastes, other chemical processes and methods have been proposed to treat the wasted materials and keep them from being environmentally hazardous. The high cost and energy needed for mining, manufacturing, handling, storing and disposing of the lime and limestone and their by-products in the wet scrubbing systems has appeared to be the stumbling block for the installation of the flue gas desulfurization systems.

It is well known that sulfur is one of the four basic raw materials of the chemical industry (the other three being coal, limestone, and salt). 85% of all sulfur used is first burned to produce sulfur dioxide for further processing for sulfuric acid production; 80% of the sulfuric acid is used in fertilizer production. Sulfur dioxide is also used in leaching ores, bleaching cloth and food products, and it is an important intermediate chemical for the chemical industry. In the U.S. demand for sulfur is increasing primarily to meet increased use of sulfur as sulfuric acid in processing phosphatic fertilizers. The sulfur produced by mining methods accounted to 54% of the domestic production, recovered elemental sulfur accounted for 34%, and by-product sulfuric acid accounted for 9% the remainder of production is in the form of pyrites, sulfur dioxides and hydrogen sulfide.

In the past high speed vacuum type centrifuges have been used for gas and isotope separation. In a gas centrifuge, a steep radial pressure gradient is established, consequently a mixture of two gas streams with different molecular weights were separated. The gas separation by mass diffusion utilizing centrifuge methods required very high electric power consumption.

The present invention provides a method for recovery of the flue gas waste heat energy for producing electric power and utilizing this power for cleaning the flue gas by separation and liquefaction of the sulfur dioxide and as desired part of the carbon dioxide gas.

The present invention utilizes high voltage and high frequency electrode screens to neutralize the electrostatic charge of the particulate matter and the gas molecules after they leave the electrostatic precipitator. A gas cooler provides means for recovery of the waste heat energy to drive a gas power expander, providing the refrigeration effect to cool the flue gases, as well as the electric power required for the sulfur dioxide gas separation and liquefaction system. Centrifuge gas separators, are used to separate heavier mixture of the flue gases, basically enriched carbon dioxide fraction with sulfur dioxide, and use of compression and cooling means to liquefy the sulfur dioxide and as desired part of the carbon dioxide. The lighter mixture of the the gases, basically, enriched nitrogen fraction, then induced in the cooling tower strong draft for an embedded release in the atmosphere. The present invention provides an economical solution to meet the Clean Air Act standards, to reduce the flue gas emissions, and to continue using the high sulfur coal as a reliable source of energy, also to recover up to 99 percent of sulfur dioxide and as desired percent of the carbon dioxide. Liquefied sulfur dioxide maybe used for further processing for sulfuric acid and sulfur element production, and liquefied carbon dioxide maybe used for further processing for use in beverage industries, sugar refinery, fertilizers, fire extinguishers, dry ice, and many other uses. The present invention provides the means to recover valuable by-products from the flue gas cleaning system, and it is understood that the scope of the invention applies to numerous applications where boiler flue gases are exhausted.

SUMMARY OF THE INVENTION

It is therefore, a principle object of the present invention to provide flue gas cleaning system which is economical to install and to operate.

It is also, a principle object of the present invention to reduce the sulfur dioxide, and carbon dioxide emitted in the flue gases from boilers in electric power plants.

It is also, a principle object of the present invention to separate and recover the sulfur dioxide, and as desired part of the carbon dioxide gas components from the flue gas stream by mechanical means, also to produce high quality liquefied sulfur dioxide and liquefied carbon dioxide products.

It is further, a principle object of the present invention to use gas compression and cooling means, to liquefy and separate the sulfur dioxide and carbon dioxide gases.

It is further an object of the present invention to desulfurize the flue gases with the least liquid and solid wastes products when compared to wet scrubbing methods.

It is further an object of the present invention to obtain liquefied sulfur dioxide, and liquefied carbon dioxide by-products from the flue gas, and to provide reasonable return on capital invested in the flue gas desulfurization (FGD) system.

It is further an object of the present invention to enhance the process of separation of the hazardous volatile substances, sulfur dioxide and carbon dioxide gases by employing a solid state electrostatic gas treater having high voltage direct current generator, and high frequency generator, to apply instant electrostatic field, and polarity reverse field to neutralize the electrostatic charges of the fine particulates and gas molecules.

It is further an object of the present invention to recover waste heat energy from the hot flue gas by employing heat exchanger and gas expander to provide the power and refrigeration capacities required for the operation of flue gas cleaning system.

It is further an object of the present invention to clean the boiler flue gases by condensing, separating and removing the hazardous vapors in the flue gases.

It is further an object of the present invention to separate sulfur dioxide in enriched fraction of carbon dioxide gas by employing high speed gas diffusion centrifuge separators.

It is further an object of the present invention to separate and liquefy the sulfur dioxide contained in the enriched carbon dioxide fraction by gas compression and cooling process.

It is further an object of the present invention to to separate and liquefy the carbon dioxide gas in the enriched fraction of carbon dioxide by gas compression and cooling process.

It is further an object of the present invention to release the cleaned flue gas with the cooling tower strong draft for an up-lift and unembeded disbursing into the atmosphere.

The present invention fulfills the long felt need to recover sulfur dioxide, and carbon dioxide from the boiler flue gas while getting reasonable Return On Investment for the installation of flue gas cleaning system.

The above and other objects and advantages of the present invention will become apparent from the following specifications, drawings and claims. It will be understood that the particular embodiments of the invention are shown by way of illustration only and not as limitation of the invention. The principle features of this invention may be employed in various embodiments without departure from the scope of the invention.

SUMMARY OF DRAWINGS

FIG. 1 is a schematic flow diagram for flue gas cleaning and removing sulfur dioxide and carbon dioxide by liquefaction.

DETAILED DESCRIPTION OF THE PRESENT INVENTION

Sulfur dioxide gas (SO2) has molecular weight of 64.06 and has specific gravity of 2.2638 compared to dry air at 32 degrees F. and 14.7 psia (1 atm.) Although the sulfur dioxide gas is more than two times heavier than air, its separation by gravity at atmospheric conditions can not be attained except after extended period of time and under controlled flow conditions. The drag resistance forces, and the complex repelling electrostatic forces from the surrounding gas molecules, slow down the fall of the sulfur dioxide molecules and keep them in suspension in the flue gas stream.

In electric utility power plants, the fine particulate matter and gas molecules leaving the electrostatic precipitator are normally positively charged, and upon their exit, they immediately seek ground, consequently, they deposit or adhere to nearby surfaces having lower near ground field potential. Sulfur dioxide liquid boils at 14.0 degrees F., at 14.7 psia (1 atm.). The low concentration of molecules of sulfur dioxide in the flue gas stream, and its very low vapor pressure requires extremely low temperature to reach its equilibrium point. For example; 3200 ppmv (0.65% wt) of sulfur dioxide in a flue gas stream at 14.7 psia, has vapor pressure of approximately 0.19 psia, and its equilibrium liquid state temperature is approximately $-100$ degrees F. In the present invention desulfurizing the flue gases is accomplished by separating an enriched carbon dioxide fraction containing sulfur dioxide in a sweep stream of the flue gas boosting its pressure and reducing its temperature in two stages to liquefy and separate the sulfur dioxide, and as desired amount of carbon dioxide.

The flue gas desulfurization cleaning system consists of six steps: The first step: Neutralizing the electrostatic charges of the flue gas leaving the electrostatic precipitator. The second step: Cooling the flue gases by recovering its heat energy to co-generate electric power, The third step: Separating the sulfur dioxide in an enriched fraction of carbon dioxide by centrifuge separators. The forth step: Liquefying and separating the sulfur dioxide from the enriched carbon dioxide fraction by use of compression, and cooling process. The fifth step: Liquefying and separating the carbon dioxide remaining in the enriched carbon dioxide gas fraction by compression and cooling process. The sixth step: Releasing the off-gas into the cooling tower strong draft stream for an uplift and unembedded disbursing in the atmosphere.

In combination of the six steps, the fine particulate matter and molecules of the components of the flue gases released from a dust collector or electrostatic precipitator, are electrostatically treated to neutralize its unipolar electrostatic charges, the gas is then cooled from below 350 degree F. to approximately 120 to 80 degree F., the acidic water vapor is condensed and removed. Two stage gas centrifuges are employed to separate a stream of heavy mixture of the flue gas components, basically an enriched fraction of carbon dioxide with sulfur dioxide gas, the enriched gas mixture is then swept under vacuum to a first stage compression, then undergo cooling process to liquefy its content of the sulfur dioxide gas, the remaining carbon dioxide gas may undergo a second stage compression and cooling to allow its liquefaction. The clean lighter mixture of the flue gas components, basically enriched fraction of nitrogen with water vapor are then released into the cooling tower strong draft for an uplift and unembeded disbursing into the atmosphere.

The airborne particulates and gas molecules in the flue gas stream leaving the electrostatic precipitator are charged with molecular positive ions. The excess ions of one polarity over the opposite polarity create a complex electrostatic field in the duct or equipment space. The positively charged airborne particles collides and deposits on any near ground field potential surfaces and walls. The resultant of the complex kinetic, thermal and diffusion effects caused by collision of the gas particles increases erosion and corrosion problems to the equipment materials. The released particulates into the atmosphere deposited on surfaces of nearby buildings and structures result into high embedded environmental impact, and cause staining and discoloring of the surrounding structures. In the present invention a high voltage-high frequency electric fields are applied on the flue gas stream by metallic screen electrodes to neutralize the airborne particulate matter and gas molecules, and to enhance its Kinematic Coagulation to adhere to each other, form larger particles, and to prevent their deposition on grounded surfaces. When the flue gas passes through the metallic screen, a high positive electrostatic field is applied through the screen, all particles and molecules are instantly charged with positive ions, then they pass through a second metallic screen, high frequency electric field is superimposed, half of the ions of the molecule reverse its polarity, consequently the molecule charge is neutralized, and each molecule is charged with approximately equal number of positive ions and negative ions. The molecules having opposite polarity will collide to form larger particles, the net effect is significant increase in coagulation of particles and more likely form chain link agglomerates.

The electrostatic bonding forces will be effected by the nature of the particle composition, its shape, size, velocity, duration of contact, as well as humidity and temperature of the gas stream.

The use of the in-stream electrostatic field treatment increases the mass of the airborne particles by effect of electrostatic coagulation enhancing the removal of the airborne particulates. In the present invention this step of electrostatic treatment is employed to enhance the separation of the ultrafine submicron particulate matter, and the separation of enriched fraction of carbon dioxide containing sulfur dioxide gas by Kinetic energy in a gas centrifuge, also to reduce the environmental impact from deposition of the flue gases released into the atmosphere.

In the second step of the present invention, a liquid refrigerant fluid employed for an electric power co-generation system enters into heat exchange relationship with the hot flue gas stream. While the flue gas is cooled, and its vapor is condensed, the high pressure liquid refrigerant is heated and evaporated. The high pressure refrigerant vapor is then expands isentropically through gas expander to a lower pressure level, consequently its temperature drops approaching the ambient temperature. The saturated vapor is then cooled into the refrigerant condenser at ambient conditions by cooling tower water to change its state to liquid. The liquid refrigerant is then pumped back to the high pressure side of the power expander cycle.

The thermal energy of the working refrigerant is removed in the form of "work"; (1) provides electric power needed to drive the components of the flue gas cleaning system and; (2) provides the refrigeration effect needed to cool the flue gas and condense its acidic vapors.

The flue gas cooler provides the means for the waste heat energy recovery to provide the electric power required for separation and liquefaction of the sulfur dioxide, and carbon dioxide gas, and for condensing and removing of the acidic water vapor of the flue gas utilizing the refrigeration effect produced by the power expander system. Approximately 66% of the acidic water vapor is condensed and removed in the flue gas cooler.

The refrigerant operating condenser pressures range from 120 to 160 psia, and temperatures of 60 to 100 degrees F. will vary with the type of refrigerant used, changes in ambient temperature conditions, and the cooling water temperature. Increased power generation occurs at lower ambient and lower cooling water temperatures. Variations in the temperature of the flue gas entering the heat exchange zone will obviously affect the temperature and pressure of the working refrigerant fluid exiting the heat exchanger. However, the higher the flue gas temperature, the higher the efficiency of the power cycle. Likewise the temperature and pressure of the refrigerant condensate exiting the refrigerant condenser would be affected by the inlet and outlet temperature of the cooling water employed in the condenser. The lower the cooling water temperature of the condenser, the higher the efficiency of the cycle.

For each Kilowatt hour of electric energy exiting a power plant facility, approximately 0.04 Kilowatt hours of additional electric power would be produced by employing the flue gas energy recovery. Approximately 75 to 85 percent of the power generated by the energy recovery in the form of electricity is used to drive the centrifuge gas separators, gas compressors, pumps, and the other components of the gas cleaning system. Thus the invented system shall provide its own power to clean the flue gases, and to produce liquefied sulfur dioxide and liquefied carbon dioxide products.

In the third step of the present invention, high speed gas centrifuge separators provide the means to enrich a carbon dioxide gas fraction containing sulfur dioxide, the kinetic energy of the centrifugal force applied creates a steep pressure gradient on the flue gas to separate enriched carbon dioxide fraction stream in the vicinity of the outer wall, and enriched nitrogen gas fraction stream in the vicinity of the axis of the centrifuge. The enriched carbon dioxide gas fraction contains the gas components having heavier molecular weight, basically sulfur dioxide and carbon dioxide, are diffused through a separating diffusion screen to the outer wall. The outer periphery wall is cooled by chilled water or direct expansion refrigeration means. Counter current flow stream patterns along the length of a tubular cyclone provides the separation between the enriched carbon dioxide fraction stream containing the heavy components mixture, and the enriched nitrogen gas fraction stream containing the light components mixture of the flue gases. The heavier mixture stream flows from top to bottom along the periphery, and the lighter mixture stream flows from bottom to top near the axis. The centrifugal and diffusive action between the two flowing streams separates the enriched nitrogen gas fraction containing lighter gas components in the axial stream and the enriched carbon dioxide gas fraction containing heavier gas components in the peripheral stream. A build up of molecules of the lighter gas components mixture is enriched at the axis, and a build up of molecules of the heavier gas components mixture is enriched at the bottom. The heavier enriched gas components are drawn from the bottom at any desired rate using vacuum means. The mass diffusion screen separates the peripheral flow stream along the cold wall from the axial flow stream. The cooling effect along the peripheral wall keeps the heavy molecules in their outer extreme radial position while they move downwardly to the bottom. Several force components act on the heavy gas components include, the pressure gradient of the centrifugal kinetic force, the gravitational force, and the vacuum force applied at the bottom discharge of the cyclone. The heavier gas mixture representing approximately 10 to 20 percent by volume of the flue gas stream is swept from the bottom outlet of the first stage centrifuge separator, basically a fraction of carbon dioxide gas enriched with the sulfur dioxide gas. The sweep stream from the first step separation is fed to a second step centrifuge separation, where part of the carbon dioxide gas is vented with nitrogen enriched fraction at the axis leaving higher concentration of the sulfur dioxide in further enriced carbon dioxide fraction.

The further enriched carbon dioxide sweep stream containing the sulfur dioxide gas is swept from the bottom of the second stage centrifuge. The water vapor condensate is separated by moisture separators placed between the contrifuges stages, and before entering the gas liquefaction step. In the forth step, the enriched carbon dioxide gas fraction, enters a first stage compressor, to boost its pressure to above 105 psia (7 atm.) its temperature rises to approximately 180 degree F. The compressed gas is then cooled under constant pressure in an aftercooler decreasing its temperature to below 40 degree F., the sulfur dioxide gas is liquefied and removed from the bottom of a moisture separator. The compressed gases released from the top of the moisture separator, basically desulfurized carbon dioxide is allowed to enter the next step to liquefy as desired part of the carbon dioxide gas. In the fifth step the enriched carbon dioxide gas mixture enters a second stage compressor to boost its pressure to above 735 psia (50 atm.), its temperature is then cooled in an aftercooler to below 40 degree F., the carbon dioxide gas is liquefied and removed from the bottom of a moisture separator while the uncondensed lighter gas components are vented to the atmosphere.

In the sixth step of the present invention, the already cleaned and cooled flue gas streams released from the gas centrifuges are induced into the cooling tower and allowed to combine with the cooling tower air stream, where the flue gases are further cleaned by the alkaline recirculating cooling water, the basic oxygen rich cooling tower water further cleans the flue gases by absorbing part of any released carbon dioxide, acidic vapors or mist carried over with the flue gas streams. The flue gases mass flow rate shall account approximately to 8 to 9 percent of the mass flow of the ambient air entering cooling tower to cool the recirculating water required for the heat rejected from the power co-generation system. The release of desulfurized flue gas in the cooling tower shall have improved disbursing of the flue gas in the atmosphere, and the strong up-draft of the plume of the cooling tower and its compact structure shall result in low emission performance when compared to the release from high flue gas exhaust stacks.

The acidic water vapor condensate removed throughout the different steps of the cooling and centrifuge gas separation processes, is transferred to a waste water treatment facility, where dilute sulfuric acid may be recovered, and the water may be cleaned, treated and recovered for use in the power plant and the cooling tower systems. A relatively small amount of sludge or dewatered solids are removed for further treatment or disposal.

The liquefied sulfur dioxide product is transfered to storage or for manufacturing processes to produce sulfuric acid or element sulfur products. The well known commercial processes for oxidation of sulfur dioxide gas to produce sulfur trioxide and sulfuric acid are not disclosed herein. Examples of these processes is the absorption process for conversion of sulfur dioxide gas to sulfuric acid and the Clause plant process for the production of sulfur element from sulfur dioxide gas. Similarly, the liquefied carbon dioxide product is transferred to storage for further handling and processing.

OPERATION

FIG. 1, indicates a flue gas cleaning system 100, where the boiler flue gases are received after removal of the particulate matter in a dust collector or electrostatic precipitator. The gases are conducted at approximate velocity of 850 FPM through an electrostatic treater 10, an electrode screen 11, applying electrostatic field having approximately 25,000 volt DC and an electrode screen 12 imposing a high frequency field having approximately 0.177 MHz to neutralize the positively charged submicron fine particles and molecules of the gas components before entering the flue gas energy recovery system 20. The heat energy in the flue gas is recovered in gas cooler 21 by heat exchanger 22, where the gases are cooled from below 350 degree F. to approximately 120 to 80 degree F. Acidic water vapors and other volatile hazardous substances condensed, and received in tank 23 are removed by liquid pump 24. The liquid refrigerant R1 under constant pressure is heated to above its vapor point and superheated at even higher temperature in the heat exchanger 22. The refrigerant R1 expands through the gas expander 25 driving electric generator 25A, consequently the refrigerant vapor is cooled to some what below the saturation temperature. The saturated refrigerant vapor, then enters condenser 27, where condenses to a liquid and received in a refrigerant condensate receiver tank 28. Recirculating cooling tower water system 60 is used for cooling and condensing the refrigerant in condenser 27, and release its latent heat of condensation into the atmosphere. The refrigerant pump 29 pressurizes the liquid refrigerant back to the flue gas heat exchanger 22. The cooled flue gases are then conducted through a mist eleminator baffles 26 to reduce the carry over of condensate mist in the flue gas stream before entering the gas centrifuge separator system 30. The gases are augmented through a first stage gas centrifuge 31, where the coagulated airborne particulates and gas molecules are subjected to a steep radial kinetic energy gradient to move the heavier molecular weight components faster than the components with lighter molecular weight, enriching the gas mixture having heavier components in the vicinity of the outer wall, and enriching the gas mixture having the lighter components in the vicinity of the axis. The flue gas mixture separated at the periphery wall contains the heavier molecular weight gas components is basically enriched carbon dioxide and sulfur dioxide fraction. The outer wall is cooled by refrigeration means to keep the heavy gas components at its outer extreme radial position while moving downwardly under the resultant force of the centrifugal pressure gradient, the gravitational force, and the vacuum applied at bottom outlet 31A. The condensed vapors are separated from the gas stream in moisture separator 33. The liquid is continuously drained from the bottom outlet 33A to a receiver tank 34, and then removed by liquid pump 35. The released gas stream from the top outlet 33B enters the second stage gas centrifuge 36. Similarly, the water vapor condensate is separated by moisture separator 37, the liquid is continuously drained from the bottom outlet 37A to a receiver tank 38, then removed by liquid pump 39. The gas stream is released from the top outlet 37B to enter the sulfur dioxide liquefaction system 40, where a gas compressor 41 boosts its pressure to above 105 psia (7 atm.), then is cooled in aftercooler 42 to below 40 degree F. A moisture separator 43 separates the liquefied sulfur dioxide from the uncondensed gases. The liquid is drained from the bottom outlet 43A to a receiver tank 44 then removed by liquid pump 45. The remaining gas components which contains more than 97 percent carbon dioxide released from the top outlet 43B is conducted through control valve 46, a part is allowed to enter system 50 at the desired flow rate. The remaining flow is vented to the atmosphere through a pressure regulating valve 56. The carbon dioxide gas mixture fed to the carbon dioxide liquefaction system 50 is further pressurized in compressor 51 to above 735 psia (50 atm.) and is then cooled in an aftercooler 52 to below 40 degree F., then enters a moisture separator 53, where the liquefied carbon dioxide is separated and drained from the bottom outlet 53A to a receiver tank 54, then removed by liquid pump 55. The cold off-gas is vented to the atmosphere from the top outlet 53B through a pressure regulating valve 57. The enriched nitrogen gas fraction released from the first and second stage centrifuges are vented into the basin of the cooling tower system 60 through a diffuser 63, where the flue gas is released jointly with the plume of the cooling tower 61. The strong updraft of the cooling tower and its compact structure result in low emission impact. The total mass flow rate of the flue gas accounts to approximately 8 to 9 percent of the total mass flow rate of the ambient cooling air required by the tower to cool the recirculating cooling water for the condenser of the power co-generation system.

The invented system shall effectively clean the flue gas by removing 60 to 70 percent of the acidic water vapors, liquefying 90 to 99 percent of the sulfur dioxide, and liquefying as desired percent of the carbon dioxide gas. High percentage of flyash and hazardous substance usually emitted in the flue gas stream shall be removed by the gas separators. Is should be understood that the mass flow rates and operating conditions given are only to demonstrate the merits of the present invention and the given values are based upon certain particulars which may vary.

What is claimed:

1. A method for recovering sulfur dioxide, carbon dioxide, and cleaning flue gases emitted from power plant, comprising:
   a. Electronically treating the flue gases to neutralize its electrostatic charges and to enhance the coagulation of its molecules and particles;
   b. Exchanging sensible and latent heat of the neutralized flue gases to lower its temperature down to a temperature approaching the ambient temperature while recovering its heat energy to co-generate electric power;
   c. Separating the flue gas in a first stage, high speed gas centrifuge to a nitrogen enriched fraction, and a carbon dioxide enriched fraction, and allowing the nitrogen enriched fraction to be vented while the carbon dioxide enriched fraction is fed to a second stage gas centrifuge, for further separating into a second step of nitrogen enriched fraction, and carbon dioxide enriched fraction;
   d. Cooling the separated enriched carbon dioxide gas fraction, after each separation stage, while removing its vapor condensate, then
   e. Compressing the enriched carbon dioxide gas fraction and simultaneously cooling the compressed gas to liquefy the sulfur dioxide gas then,
   f. Allowing the sulfur dioxide gas to condense, and continuously removing the liquefied sulfur dioxide;
   g. Compressing the desulfurized enriched carbon dioxide fraction to further increase its pressure, and simultaneously cooling the compressed gas to liquefy the carbon dioxide gas, then;
   h. Allowing the carbon dioxide gas to condense and continuously removing the liquefied carbon dioxide;
   i. Allowing the light components of the flue gas to be released in a cooling tower discharge plume.

2. The method of claim 1 wherein a high voltage D.C current is applied to a metallic screen electrode to positively charge the molecules and particles of the flue gas stream, and imposing a high frequency electric current applied on a second metallic screen to neutralize the positively charged molecules and particles.

3. The method of claim 1 wherein employing an electric power co-generation system comprising;
   a. continuously exchanging sensible and latent heat of the flue gas at below 350 degree F. with pressurized refrigerant working fluid to vaporize the fluid and condense the flue gas vapors; subsequently
   b. expanding the pressurized refrigerant vapor while simultaneously employing the vapor to drive an electric generator, then
   c. allowing the refrigerant vapor to condense; and
   d. recycling the condensed refrigerant under pressure.

4. The method of claim 3 wherein the latent heat of condensation of the working refrigerant vapor is rejected to the atmosphere by a cooling water tower system.

5. A method of claim 1, wherein employing two stage centrifuge separators to separate an enriched carbon dioxide fraction stream from an enrich nitrogen fraction stream comprising;
   a. Increasing the velocity of the flue gas to impose steep kinetic energy force gradient on the gas components;
   b. Allowing the heavier components of the enriched carbon dioxide fraction to diffuse through a separating diffusion screen at the periphery outer wall;
   c. Allowing the heavier gas mixture components of the enriched carbon dioxide fraction to entrap between the diffusing screen and the outer periphery wall to cool, then;
   d. Removing the heavier gas mixture components of the enriched carbon dioxide fraction from the bottom of the cyclone by vacuum while allowing the ligher gas mixture components of the enriched nitrogen gas fraction to discharge at the top.

6. The combination of claim 5 wherein a liquid chiller or direct expansion means provides cooling for the outer periphery wall of the centrifuge gas separator.

7. The combination of claim 5 comprising separating and collecting the flue gas vapor condensate.

8. A method of claim 1 wherein employing a two stage gas compression system to liquefy the sulfur dioxide and carbon dioxide gas components in the enriched flue gas stream, comprising;
   a. Compressing the sweep heavy flue gases downstream from the second stage gas separator to a higher pressure level enough to allow liquefaction of the sulfur dioxide contained into its mixture by cooling, then
   b. Continuously separating and removing the liquefied sulfur dioxide gas;
   c. Further compressing the desulfurized heavy gas mixture of the enriched carbon dioxide fraction in a second stage compressor to allow liquefaction of the carbon dioxide contained into the sweep gas by cooling, then d. Continuously separating and removing the liquefied carbon dioxide gas; and e. Allowing the uncondensed gas to release to the atmosphere.

9. A method of claim 1, wherein the cleaned flue gases are conducted and released in the cooling water tower air stream.

10. In combination, a. an electric power plant having a continuous emission of boiler flue gases with high sulfur dioxide content;

b. a conduit for conducting the flue gas emissions;

c. an electrostatic gas treatment to neutralize the gas molecules and particles to enhance airborne particulate removal and increase the gas molecules coagulation;

d. a heat exchange system for absorbing heat from the flue gas to allow the flue gas cooling and condensing its vapor, and utilize the recovered heat energy to drive a gas expander to co-generate electric power;

e. a two stage centrifuge gas separation system for separating enriched carbon dioxide gas fraction and enriched nitrogen gas fraction streams;

f. a first stage gas compressor system downstream of the second stage separator for boosting the enriched sweep gas stream pressure;

g. a first stage compressed gas aftercooler to cool the first stage compressed gas and to condense and liquefy sulfur dioxide gas;

h. a moisture separator to separate the gas from the sulfur dioxide liquid;

i. a second stage gas compressor system downstream of the first stage gas compressor system to further boost the desulfurized gas pressure;

j. a second stage compressed gas aftercooler to cool the second stage pressurized gas and to condense and liquefy carbon dioxide gas;

k. a moisture separator to separate the gas from the carbon dioxide liquid;

l. a flue gas conduit and diffusing system to allow releasing the lighter gas mixture releasing the lighter gas mixture released from the centrifuge separators into the cooling tower.

* * * * *